US006061229A

United States Patent [19]

Gates et al.

[11] Patent Number: 6,061,229

[45] Date of Patent: May 9, 2000

[54] MOUNTING ARRANGEMENT FOR COMMUNICATIONS NETWORK BASE STATIONS WITHIN A TOWER INTERIOR

[75] Inventors: Frank V. Gates, Succasunna, N.J.; Daniella R. Rubinovitz, New York, N.Y.

[73] Assignee: Lucent Technologies Inc., Murray Hill, N.J.

[21] Appl. No.: 09/197,846

[22] Filed: Nov. 23, 1998

[51] Int. Cl.[7] ........ H02B 1/04

[52] U.S. Cl. ........ 361/610; 361/600; 361/614; 312/223.1; 312/223.2; 312/324; 312/325; 312/305; 248/202.1; 455/347

[58] Field of Search ........ 361/600, 610, 361/614, 615, 616; 312/223.1, 223.2, 321.5, 324, 325, 305; 248/282.1; 455/347–351

[56] References Cited

U.S. PATENT DOCUMENTS 3,808,504 4/1974 Rabie ........ 361/610
4,214,291 7/1980 Koshman et al. ........ 361/610
4,239,311 12/1980 Brownlee et al. ........ 312/305
4,884,655 12/1989 Freadman et al. ........ 181/145
5,145,245 9/1992 Fierthaler ........ 312/321.5

*Primary Examiner*—Leo P. Picard
*Assistant Examiner*—Boris L. Chervinsky

[57] ABSTRACT

A mounting arrangement for communications network base stations within a tower interior wherein each base station is secured between upper and lower platform plates by a pair of co-axial swivel mounts. The swivel mounts allow the base stations to be rotated about a vertical axis between a first angular position suitable for the base station to operate and to allow the platform to be raised and lowered and a second position in which the base station door can be fully opened to provide access to the base station interior for maintenance purposes.

9 Claims, 4 Drawing Sheets

MOUNTING ARRANGEMENT FOR COMMUNICATIONS NETWORK BASE STATIONS WITHIN A TOWER INTERIOR

BACKGROUND OF THE INVENTION

This invention relates to improved accessibility to communications network base stations mounted to a vertically movable platform within a tower interior.

Cellular telephone base stations typically have an electronics assembly mounted where it is readily accessible to a technician and one or more antennas mounted on an elevated structure to increase the line-of-sight range of the base station. Recently, a smaller cell site, called a microcell, has been developed to cover "hot spots" and "dead spots". The microcell uses less power and provides fewer channels than a "normal" cell site and was designed for a smaller coverage area. However, for some applications it would be advantageous to increase the coverage area of the microcell. Increased coverage area could be achieved by installing a more powerful radio frequency amplifier in the microcell. However, the size of the box containing the microcell is too small to accommodate the more powerful amplifier and to dissipate the additional heat generated thereby.

The increased coverage area could also be achieved by radiating from a taller tower, but if the cell site is at the base of the tower, significant losses occur in the cabling between the cell site and the antennas. In any event, the microcell antenna may be integrated with the electronics in the same box. Accordingly, it would be advantageous to locate the microcell at the top of the tower, since changing the elevation of the microcell from twenty feet to one hundred feet would increase the coverage area by a factor of about four. However, active electronics on the top of a tower need maintenance, so that the electronics either has to be lowered to a technician or the technician has to be raised to the electronics. It would be preferable to be able to raise and lower the electronics. This has been done in the past by using a cable and a winch with pulleys at the top of the tower and with a platform holding the electronics on the outside of the tower, along with the hoist mechanism. It has been proposed to contain the microcell platform within the confines of the tower interior for reasons of safety, structural integrity, esthetics, etc.

Since the microcells have a limited horizontal angular coverage range (on the order of 120°), full coverage requires that at least three microcells be mounted to the platform. It would be desirable to mount all the microcells at the same level on the platform, rather than stacking them vertically. However, a typical tower is an open latticework structure of triangular cross section which limits the space available for mounting the microcells. While three microcells can be mounted in the available triangular space, it has been found that the door of each microcell is prevented from opening by interference with an adjacent microcell. It would therefore be desirable to have a mounting arrangement wherein the microcells are mounted to the platform all at the same level while still allowing each microcell door to be opened to allow maintenance of the microcell.

SUMMARY OF THE INVENTION

According to the present invention, there is provided an arrangement for mounting a plurality of communications network base stations to a platform within a tower interior. At least one of the base stations has a door hinged about a substantially vertical axis. For that base station, the mounting arrangement comprises a horizontal first mounting plate, to a surface of which the base station is secured, and a first swivel mount secured to the platform and to the first mounting plate. The first swivel mount allows the first mounting plate to rotate with respect to the platform about a vertical swivel axis. Thus, the base station can be rotated about the vertical swivel axis from an operating position to a maintenance position wherein its door can be opened without interfering with an adjacent base station.

In accordance with an aspect of this invention, the first swivel mount comprises a first swivel plate secured to the platform, a second swivel plate secured to the first mounting plate, a bearing secured to one of the first and second swivel plates and centered about the vertical swivel axis, and a shaft secured to the other of the first and second swivel plates and journalled for rotation in the bearing about the vertical swivel axis.

In accordance with another aspect of this invention, the first swivel mount further comprises a pair of stop members secured to one of the first and second swivel plates to define an included angle therebetween about the vertical swivel axis. The pair of stop members extend toward the other of the first and second swivel plates. A tab is secured to the other of the first and second swivel plates and extends toward the one of the first and second swivel plates within the included angle defined by the pair of stop members. The tab interferes with the pair of stop members to limit the rotation of the first swivel mount to the included angle.

In accordance with a further aspect of this invention, the first swivel mount further comprises a locking arrangement releasably securing the tab to a selected one of the pair of stop members.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
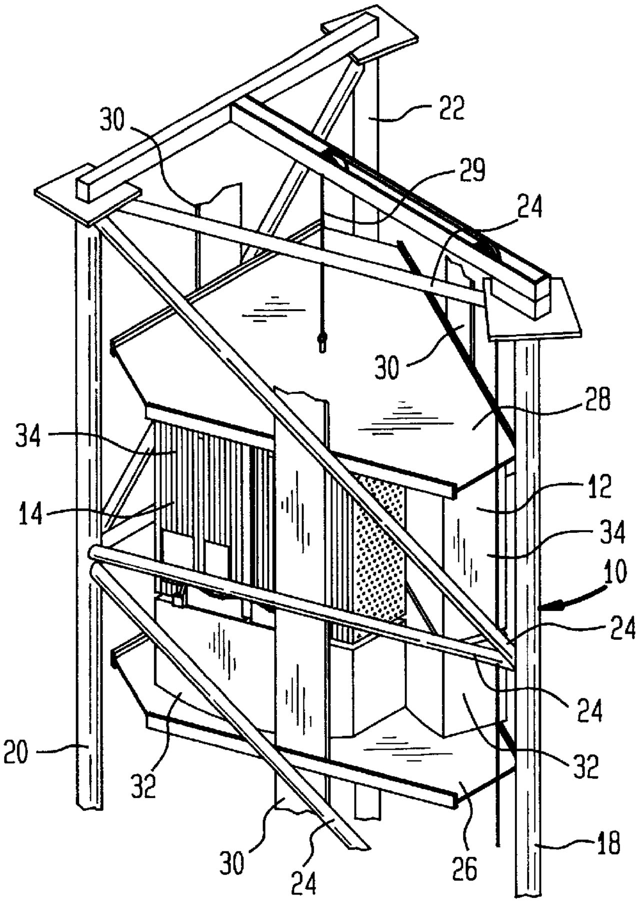
FIG. 1 is a perspective view showing a group of communications network base stations (i.e., microcells) mounted in accordance with the present invention to a platform situated near the top of a tower.

Referring now to the drawings, FIG. 1 shows a portion of a tower, designated generally by the reference numeral 10, in which is installed a vertically movable platform provided with a mounting arrangement according to the present invention for the microcells 12, 14, 16. Illustratively, the tower 10 is a three-sided (i.e., triangular) latticework tower having three vertically oriented members 18, 20, 22 which are interconnected by a plurality of transverse braces 24. Although the tower 10 is shown as being triangular, other multi-sided towers can be utilized when practicing the present invention. In all cases, the transverse braces interconnect adjacent ones of the vertical oriented members of the tower, so that the interior of the tower is open.

Figure 2:
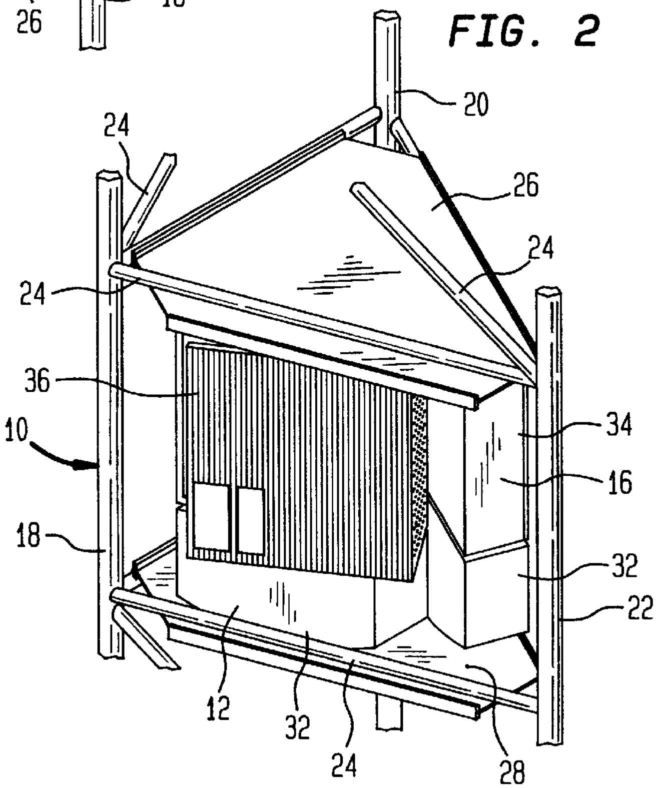
FIG. 2 is a perspective view showing the platform shown in FIG. 1 in a lower position on the tower with the door of a base station being open so that maintenance can be performed on the base station.

A platform including a lower plate 26 and an upper plate 28 is installed within the tower 10 and is arranged for vertical movement therein, illustratively by a winch driven hoist cable 29. The plates 26, 28 are secured each to the other by the skids 30, illustratively one on each side of the three-sided plates 26, 28. FIG. 1 shows the platform near the top of the tower 10 so that the microcells 12, 14, 16 can be operative. FIG. 2 shows the platform near the bottom of the tower 10 so that the microcells 12, 14, 16 are available for maintenance purposes. Each of the microcells 12, 14, 16 includes a lower utility box 32 and an upper electronics box 34 having a door 36 which is hinged about a vertical axis. As shown in FIG. 2, near the bottom of the tower 10 some of the angled transverse braces 24 are removed to leave a rectangular opening for gaining access to the microcells 12, 14, 16 for maintenance purposes. Additionally, when a microcell requires maintenance, the skid 30 located in front of that microcell is removed, by unbolting it from the plates 26, 28.

Figure 3:
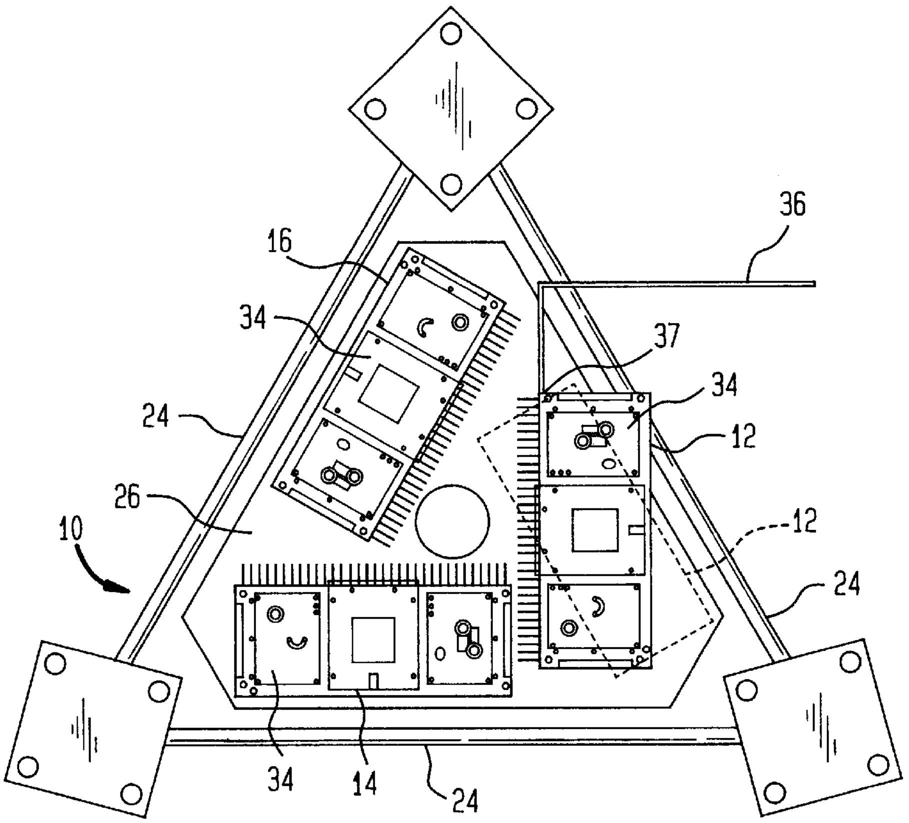
FIG. 3 is a top plan view showing the mounting of three base stations according to the present invention with one of the base stations being rotated to a maintenance position and with its door open, the travel and operating position of that base station being shown by the broken line outline.

As best shown in FIG. 3, to fit the three microcells 12, 14, 16 on the platform within the confines of the interior of the tower 10 so that the platform can be raised and lowered, the microcells 12, 14, 16 are arranged between the plates 26, 28 each with its front face parallel to respective sides of the plates 26, 28. However, the microcells 12, 14, 16 are constructed with the vertical hinge 37 of the door 36 being located at a rear corner of the microcell, so that the door 36 is L-shaped. Thus, when the microcells 12, 14, 16 are positioned so as to be entirely within the confines of the interior of the tower 10, the door 36 of each microcell cannot be opened fully to allow access to the interior of the microcell because it is interfered with by an adjacent microcell. Thus, for example, the door 36 of the microcell 12 cannot be opened because it is interfered with by the microcell 16.

According to the present invention, this problem is overcome by mounting the microcells 12, 14, 16 to the plates 26, 28 so that each microcell is rotatable approximately 30° in a clockwise direction, as viewed from above, from its operating and travel position to its maintenance position. This allows for full opening of the door 36, as shown in FIG. 3.

Figure 5:
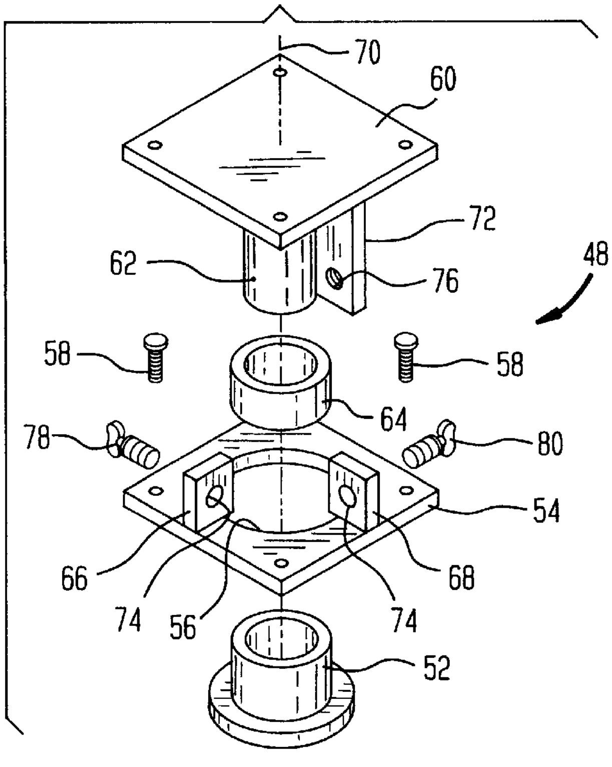
FIG. 5 is an exploded perspective view showing the details of a swivel mount according to the present invention.
Figure 4:
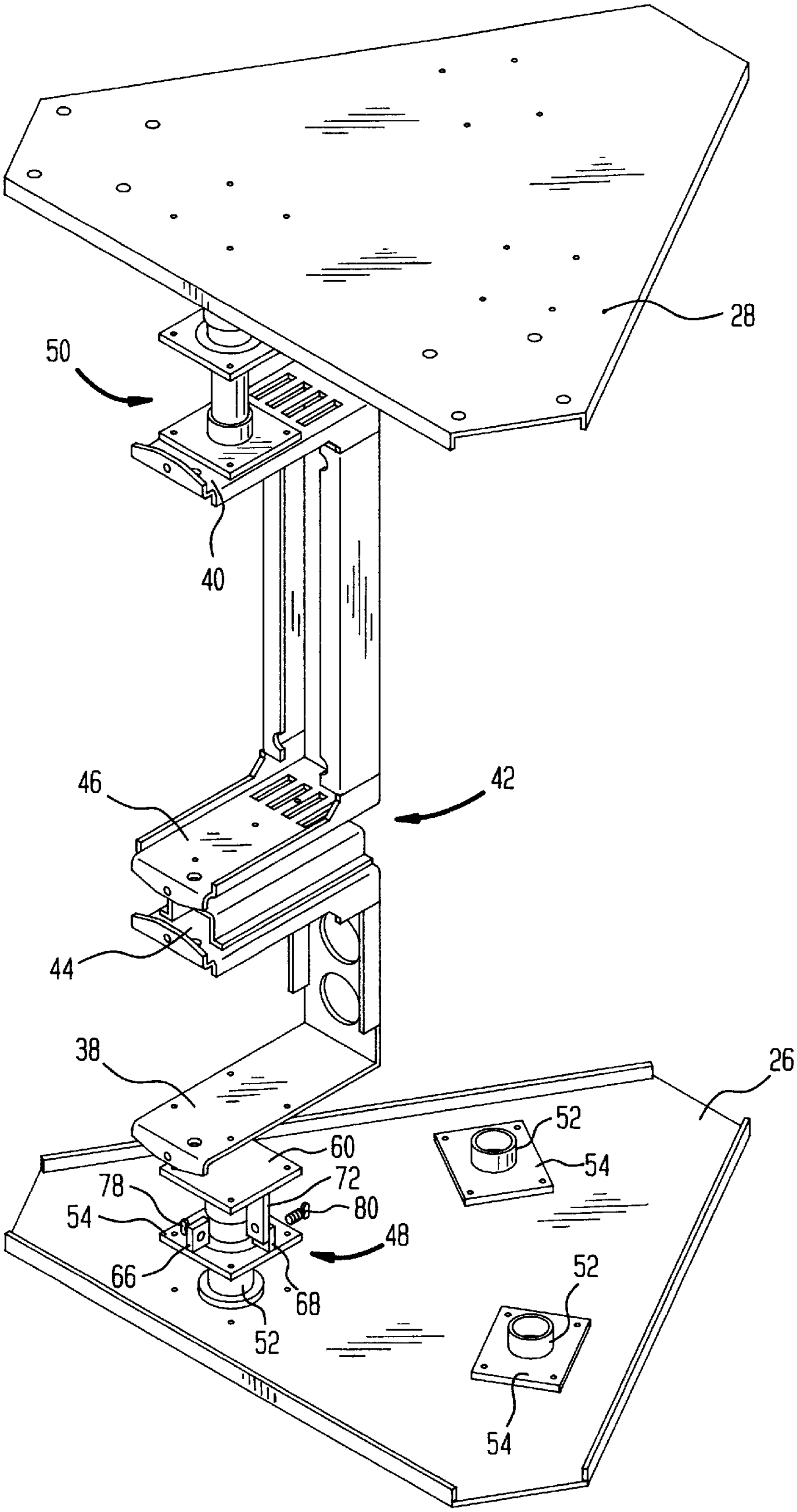
FIG. 4 is a partially exploded perspective view of a mounting arrangement according to the present invention.
Figure 6:
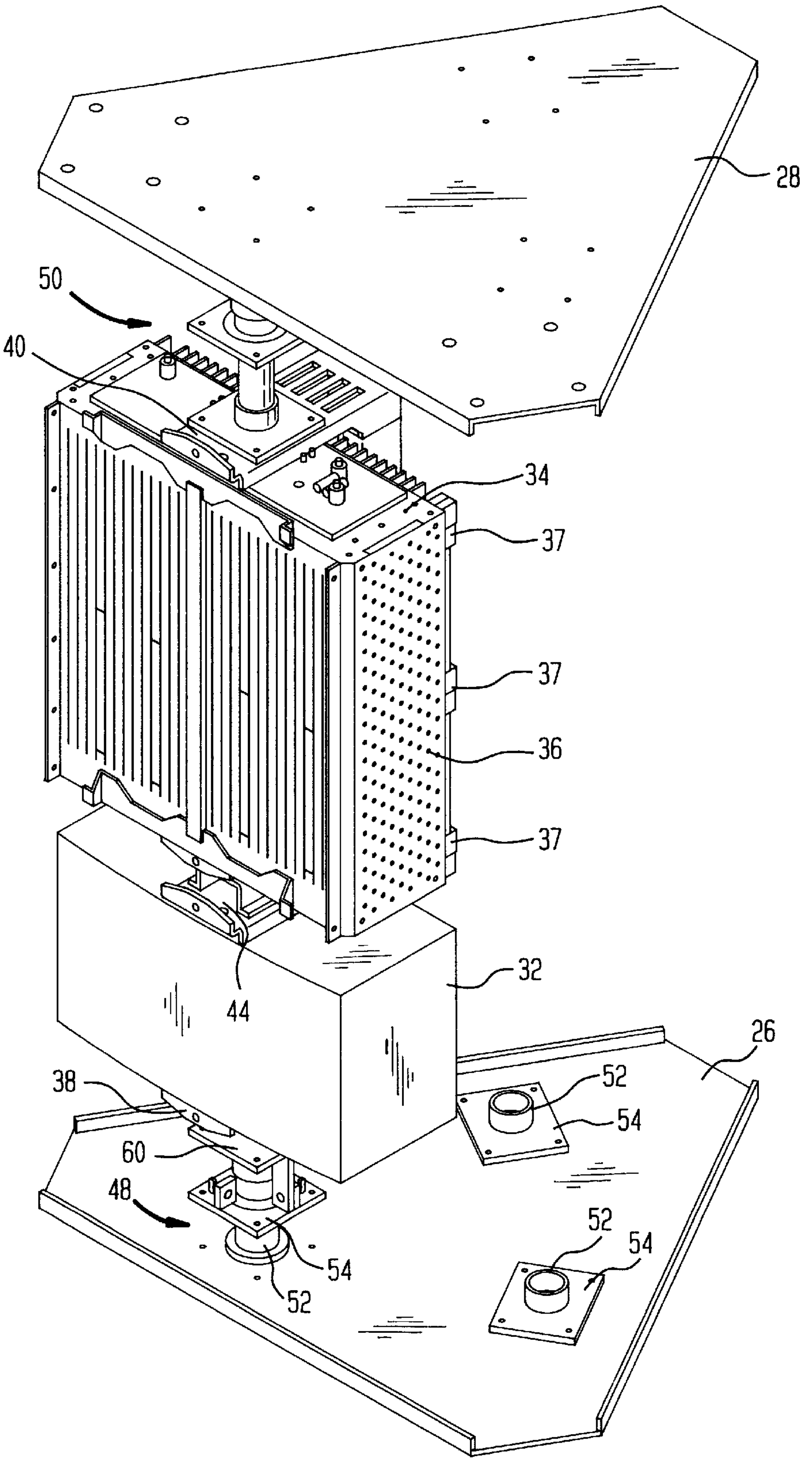
FIG. 6 is a perspective view, partially exploded, showing the mounting of a base station to a platform in accordance with the present invention.

Referring now to FIGS. 4–6, the inventive mounting arrangement includes a lower mounting plate 38 and an upper mounting plate 40. A microcell is secured to a surface of each of the plates 38, 40. As shown, the plates 38, 40 are part of a bracket assembly 42, which includes intermediate plates 44, 46. This is because the illustrated microcell is formed of two parts, the utility box 32 and the electronics box 34. If a base station only has a single box, then the intermediate plates 44, 46 may be eliminated and the base station would be secured to the lower mounting plate 38 and the upper mounting plate 40 only, with bracket structure interconnecting the two mounting plates.

The bracket assembly 42 is secured to the lower platform plate 26 and the upper platform plate 28 by respective co-axial swivel mounts 48, 50. The details of the swivel mount 48 are shown in FIG. 5, it being understood that the swivel mount 50 is preferably of identical construction.

Thus, as shown, the swivel mount 48 includes a flanged bearing 52. A first swivel plate 54 has a central opening 56 which fits over the bearing 52. The first swivel plate 54 is then secured to the platform plate 26 by screws 58 or the like so as to capture the flange of the bearing 52 between the plates 54, 26. A second swivel plate 60 is secured to the mounting plate 38 of the bracket assembly 42. A swivel shaft 62 is secured to the plate 60, as by welding or the like, and is inserted into the bearing 52 so as to be journalled for rotation therein about a vertical swivel axis 70. A bearing spacer 64 sits atop the bearing 52 and below the second swivel plate 60.

When a base station is swiveled to a selected position, whether it be the travel and operating position or the maintenance position, it would be desirable to be able to lock the base station in that selected position so that there is no unwanted swiveling, which might be caused by a gust of wind or some other perturbation. Accordingly, the swivel mount 48 also includes the stop members 66, 68 secured to the plate 54. Illustratively, each of the stop members 66, 68 is a rectangular plate which is oriented vertically and is welded to the swivel plate 54. The stop members 66, 68 are radially oriented with respect to the swivel axis 70 and are angularly spaced about the vertical swivel axis 70 to define an included angle therebetween. This included angle defines the angle by which the base station is to be rotatable. In the illustrative embodiment, this angle would be 30°, although for purposes of clarity the stop members 66, 68 are shown as defining an included angle of 90°. A tab 72 is secured to the swivel plate 60 and extends radially outward from the swivel axis 70 and downwardly toward the swivel plate 54 within the included angle defined by the stop members 66, 68. The tab 72 extends sufficiently downward that when the swivel plate 60 is rotated, the tab 72 comes into interfering engagement with the stop members 66, 68 to limit the rotation of the swivel plate 60 to the included angle.

In order to lock the swivel mount 48 to one or the other of the desired angular positions for the base station, each of the stop members 66, 68 has a hole 74 therethrough. The hole 74 of the stop members 66, 68 are at the same radial distance from the vertical swivel axis 70 and at the same vertical distance from the plate 54. The tab 72 is preferably a vertically oriented plate secured to the swivel plate 60 by welding or the like and is formed with an internally threaded hole 76 so positioned that when a tab 72 is in interfering contact with one of the stop members 66, 68, the hole 76 is in alignment with the hole 74 of that stop member. A thumb screw 78 is captively journalled for rotation in the hole 74 of the stop member 66 and a thumb screw 80 is captively journalled for rotation in the hole 74 of the stop member 68. Accordingly, when the tab 72 is brought into interfering contact with one of the stop members 66, 68, the corresponding thumb screw 78, 80 can be threadedly engaged with the hole 76, thereby releasably securing the tab 72 to that stop member.

As shown in FIGS. 4 and 6, three spaced swivel mounts are mounted to each of the platform plates 26, 28, with each opposed pair of swivel mounts being rotatable about the same respective vertical swivel axis. Thus, three base stations can be accommodated between the platform plates 26, 28.

Accordingly, there has been disclosed an improved mounting arrangement for communications network base stations within a tower interior. While an illustrative embodiment of the present invention has been disclosed herein, it is understood that various modifications and adaptations to the disclosed embodiment are possible and it is therefore intended that this invention be limited only by the scope of the appended claims.

What is claimed is:

1. A mounting arrangement for mounting a plurality of communications network base stations to a platform within a tower interior, wherein at least one of the base stations has a door hinged about a substantially vertical axis, for said at least one base station the mounting arrangement comprising:

a horizontal first mounting plate, to a surface of which said at least one base station is adapted to be secured; and a first swivel mount adapted to be secured to said platform and secured to said first mounting plate, said first swivel mount allowing said first mounting plate to rotate with respect to said platform about a vertical swivel axis;

wherein said first swivel mount comprises:

a first swivel plate adapted to be secured to said platform;

a second swivel plate secured to said first mounting plate;

a bearing secured to said first swivel plate and centered about said vertical swivel axis; and a shaft secured to said second swivel plate and journalled for rotation in said bearing about said vertical swivel axis.

2. The mounting arrangement according to claim 1 wherein the platform includes a horizontal lower platform plate and a horizontal upper platform plate with the base station adapted to be secured to the upper surface of the first mounting plate and the first swivel mount adapted to be secured to the lower platform plate, the mounting arrangement further comprising:

a horizontal upper mounting plate, to the lower surface of which said at least one base station is adapted to be secured; and an upper swivel mount adapted to be secured to said upper platform plate and secured to said upper mounting plate, said upper swivel mount allowing said upper mounting plate to rotate with respect to said upper platform plate about said vertical swivel axis.

3. The mounting arrangement according to claim 2 further comprising:

a bracket assembly secured to said first mounting plate and to said upper mounting plate, said bracket assembly causing said first mounting plate and said second mounting plate to rotate one with the other.

4. The mounting arrangement according to claim 1 wherein said first swivel mount further comprises:

a pair of stop members secured to said first swivel plate to define an included angle therebetween about said vertical swivel axis, said pair of stop members extending toward said second swivel plate; and a tab secured to said second swivel plate and extending toward said first swivel plate within the included angle defined by said pair of stop members, said tab interfering with said pair of stop members to limit the rotation of said first swivel mount to said included angle.

5. The mounting arrangement according to claim 4 wherein said first swivel mount further comprises:

a locking arrangement releasably securing said tab to a selected one of said pair of stop members.

6. The mounting arrangement according to claim 5 wherein:

each of said pair of stop members comprises a vertical plate having a hole therethrough, each vertical plate being oriented radially with respect to said vertical swivel axis and the pair of vertical plates being angularly spaced about said vertical swivel axis by said included angle, with the stop member holes being at the same radial distance from the vertical swivel axis and at the same vertical distance from the first swivel plate;

said tab comprises a vertical plate oriented radially with respect to said vertical swivel axis and having an internally threaded hole therethrough, said tab hole being located on said tab so that when said tab is in interfering contact with a stop member the holes of said tab and that stop member are in alignment; and said locking arrangement includes a screw extendable through the hole of said selected stop member and threadedly engagable with the tab hole.

7. The mounting arrangement according to claim 6 wherein said locking arrangement comprises a pair of thumb screws each captively journalled for rotation in a respective stop member hole.

8. In combination:

a tower having an interior horizontal platform plate;

a plurality of horizontal mounting plates;

a plurality of swivel mounts each secured to the platform plate and to a respective one of the mounting plates, each swivel mount allowing its respective mounting plate to rotate with respect to the platform plate about a respective vertical swivel axis; and a plurality of communications network base stations each secured to a respective one of the mounting plates, each base station having a respective door hinged about a respective substantially vertical door axis;

wherein when the base stations are positioned entirely within the confines of the tower interior opening of a base station door is impeded, and wherein each base station can be swiveled about its respective swivel axis so that opening of its door is not impeded.

9. The combination according to claim 8 wherein the tower includes an interior horizontal lower platform plate and an interior horizontal upper platform plate with each base station being secured to the upper surface of its respective mounting plate and each swivel mount being secured to the lower platform plate, the combination further comprising:

a plurality of horizontal upper mounting plates, to the lower surface of each a respective base station is secured; and a plurality of swivel mounts secured to said upper platform plate and to a respective upper mounting plate, each upper swivel mount allowing its respective upper mounting plate to rotate with respect to said upper platform plate about the vertical swivel axis associated with the respective base station.

* * * * *

UNITED STATES PATENT AND TRADEMARK OFFICE
CERTIFICATE OF CORRECTION

PATENT NO. : 6,061,229
DATED : May 9, 2000
INVENTOR(S) : Frank V. Gates, Daniella R. Rubinovitz and Sergio A. Delgado It is certified that error appears in the above-identified patent and that said Letters Patent is hereby corrected as shown below:

Add the Inventor:

Sergio A. Delgado, Lake Hopatcong, NJ

Signed and Sealed this

Tenth Day of July, 2001

*Attest:*

Nicholas P. Godici

NICHOLAS P. GODICI

*Attesting Officer*

*Acting Director of the United States Patent and Trademark Office*

UNITED STATES PATENT AND TRADEMARK OFFICE
Certificate

Patent No. 6,061,229 Patented: May 9, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Frank V. Gates, Succasunna, NJ; Daniella R. Rubinovitz, New York, NY; and Sergio A. Delgado, Lake Hopatcong, NJ.

Signed and Sealed this Twenty-third Day of April 2002.

DARREN SCHUBERG
*Supervisory Patent Examiner*
Art Unit 2835